(12) United States Patent
Yamanaka

(10) Patent No.: US 6,432,348 B1
(45) Date of Patent: Aug. 13, 2002

(54) PROCESS FOR FORMING POLYIMIDE COMPOSITE ELECTRO-DEPOSITED FILM

(75) Inventor: Hideo Yamanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/334,662

(22) Filed: Jun. 17, 1999

(30) Foreign Application Priority Data

Jun. 29, 1998 (JP) ............................................ 10-182235

(51) Int. Cl.$^7$ ............................... B29C 71/04; C08J 7/18
(52) U.S. Cl. ...................... 264/446; 264/447; 264/104; 264/130; 204/166; 204/220; 205/471
(58) Field of Search ................................ 264/104, 105, 264/130, 131, 134, 250, 254, 255, 446, 447; 205/164, 166, 220, 317; 204/471, 489

(56) References Cited

U.S. PATENT DOCUMENTS

| | | | | |
|---|---|---|---|---|
| 3,616,396 A | * | 10/1971 | Swanson | 204/181 |
| 3,663,728 A | * | 5/1972 | Hoback et al. | |
| 3,766,117 A | * | 10/1973 | McQuade | |
| 3,850,773 A | * | 11/1974 | Lupinski et al. | 204/181 |
| 4,053,444 A | * | 10/1977 | Phillips | 204/181 |
| 4,368,167 A | * | 1/1983 | Berchielle | 264/104 |
| 4,938,569 A | * | 7/1990 | Tsunoda et al. | 350/336 |
| 5,158,657 A | * | 10/1992 | Kadokura | 204/181.1 |
| 5,503,732 A | * | 4/1996 | Miyazaki et al. | 205/122 |
| 5,561,011 A | * | 10/1996 | Miyazaki et al. | 430/7 |
| 5,578,403 A | * | 11/1996 | Watanabe et al. | 430/7 |
| 5,820,742 A | * | 10/1998 | Oda et al. | 205/317 |
| 6,149,857 A | * | 11/2000 | McArdle et al. | 264/429 |

* cited by examiner

Primary Examiner—Angela Ortiz
(74) Attorney, Agent, or Firm—Sonnenschein, Nath & Rosenthal

(57) ABSTRACT

A process for forming a polyimide composite electro-deposited film, which excels in durability of ink repelling function, wear resistance or mold-releasing property, has the following steps. An electrically conductive film is formed on at lest one side of a resin substrate. The polyimide composite electro-deposited film is formed on the electrically conductive film, while allowing co-deposition of at least one type of eutectic fine particles selected from the group consisting of water-repellant fine particles, wear-resistant fine particles and mold-releasing fine particles. This process can be used in the production of a nozzle plate having a discharge nozzle, by employing the water-repellant fine particles as the eutectic fine particles. When a metallic substrate is used, the polyimide composite electro-deposited film may be directly formed on one or both surfaces of such a metallic substrate.

18 Claims, 5 Drawing Sheets

PROCESS FOR FORMING POLYIMIDE COMPOSITE ELECTRO-DEPOSITED FILM

RELATED APPLICATION DATA

The present application claims priority to Japanese Application No. P10-182235 filed Jun. 29, 1998, which application is incorporated herein by reference to the extent permitted by law.

BACKGROUND OF THE INVENTION

1. Field of the Invention

The present invention relates to a process of forming polyimide composite electro-deposited film, suitable for use in the production of, for example, a nozzle plate of an ink jet recording head.

2. Description of the Related Art

In general, an ink jet recording head discharges ink droplets to form images of objects such as characters on a recording medium. Such an ink jet recording head has a nozzle plate, referred to also as an orifice plate, that controls positions where the ink droplets are to be discharged, as well as quantities of the ink to be discharged, in order to achieve printing with high precision.

The nozzle plate has an ink discharge nozzle constituted by a tiny hole of an inside diameter ranging from 30 to 50 μm for discharging the ink and a diluting liquid nozzle that discharges a diluting liquid.

The nozzle plate is usually formed of a material which excels in heat resistance, chemical resistance, durability, excimer-laser workability and so forth, such as, for example, polyimide or polyetherimide. In order to stabilize the printing quality, an ink-repellant treatment is effected on the surface of the nozzle plate.

Ordinary ink-repellant agents such as a fluoric coating agent or fluoro-alkylsilane-type agent, however, exhibits inferior adhesion to polyimide or polyetherimide used as the material of the nozzle plate. Direct coating of such a nozzle plate material with the above-mentioned ordinary ink-repellant agent undesirably allows easy separation of the coating film and is not recommended.

Hitherto, therefore, a nozzle plate has been known having a teflon eutectoid plated layer formed directly on a flat substrate by electro-plating or electroless plating for the purpose of achieving satisfactory water- and oil-repelling characteristics, as well as anti-wear characteristics, as disclosed in Japanese Patent Laid-Open No. 4-74651.

The plating technique relying upon eutectic phenomenon, however, has a problem in that only small bonding force is produced between the water-repellant particles (teflon) in the resultant teflon eutectoid plating layer, i.e., the composite plating layer, and the metal which is nickel. In particular, the water-repellant fine particles around the nickel metal surface tend to easily come off due to, for example, wiping, allowing rapid deterioration of water- and oil-repelling performance.

When electro-plating technique is adopted, it is necessary that a underlying metallic layer such as of nickel is formed on the substrate by evaporation or sputtering. However, such a metal layer may exhibit inferior adhesion to the substrate according to the type of the substrate, leading to problems such as insufficient durability due to separation.

Electroless plating does not require formation of an underlying metallic layer, but the adhesion of the plating layer may fail to exhibit inferior adhesion, thus leading to the problem of insufficient durability due to easy separation.

Adhesion is particularly inferior when the nozzle plate is made of the aforementioned polyimide or polyetherimide which excel in the properties such as heat resistance, chemical resistance, durability and excimer-laser-perforating workability. When such materials are used, the teflon eutectoid plating film is easily separated, even if the film is formed by electroless plating.

SUMMARY OF THE INVENTION

Accordingly, it is an object of the present invention to provide a process of forming a polyimide composite electro-deposited film which excels in water-repelling performance, wear resistance or die releasing characteristic, thus offering improved durability of the ink repelling effect.

To this end, according to one aspect of the present invention, there is provided a process for forming a polyimide composite electro-deposited film, comprising the steps of: forming an electrically conductive film on at lest one side of a resin substrate; and forming, on the electrically conductive film, the polyimide composite electro-deposited film while allowing co-deposition of at least one type of eutectic fine particles selected from the group consisting of water-repellant fine particles, wear-resistant fine particles and mold-releasing fine particles.

In accordance with this process, the polyimide composite electro-deposited film is formed on the conductive film covering the resin substrate, while allowing co-deposition of one or more eutectic fine particles selected from among water-repellant fine particles, wear-resistant fine particles and mold-releasing fine particles. It is therefore possible to impart to the resin substrate one or more of the desired characteristics selected from among water-repelling performance, wear resistance or mold-releasing performance.

In accordance with another aspect of the present invention, there is provided a process for forming a polyimide composite electro-deposited film, comprising the steps of: forming, on at lest one side of a metallic substrate, the polyimide composite electro-deposited film while allowing co-deposition of at least one type of eutectic fine particles selected from the group consisting of water-repellant fine particles, wear-resistant fine particles and mold-releasing fine particles.

In accordance with this process, the polyimide composite electro-deposited film is formed on the metallic substrate, while allowing co-deposition of one or more eutectic fine particles selected from among water-repellant fine particles, wear-resistant fine particles and mold-releasing fine particles. It is therefore possible to impart to the metallic substrate one or more of the desired characteristics selected from among water-repelling performance, wear resistance or mold-releasing performance.

The above and other objects, features and advantages of the present invention will become clear from the following description when the same is read in conjunction with the accompanying drawings.

DESCRIPTION OF THE PREFERRED EMBODIMENT

The present invention will now be described in detail, with reference to the accompanying drawings showing preferred embodiments.

FIGS. 1A to 1E are illustrations of successive steps of an embodiment of the process of the invention for forming a polyimide composite electro-deposited film applied to the production of a nozzle plate, showing the nozzle plate at different steps of the process in sectional side views.

Figure 1A:
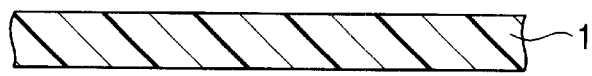
FIGS. 1A to 1E are illustrations of successive steps of an embodiment of the process of the invention for forming a polyimide composite electro-deposited film applied to the production of a nozzle plate, showing the nozzle plate at different steps of the production in sectional side views.

First of all, a resin substrate 1 is prepared as shown in FIG. 1A. This resin substrate 1 is made of a flat polyimide sheet having a smooth surface and a thickness of about 125 $\mu$m or so. The resin substrate 1 has undergone a supersonic cleaning treatment conducted with the aid of n organic solvent such as acetone or IPA, followed by cleaning by UV irradiation. The resin substrate 1 thus cleaned may further be subjected to a plasma $O_2$ treatment for the purpose of improving adhesion of a resin coating agent which will be described later. Although the polyimide sheet is specifically mentioned as the material of the resin substrate, it is to be understood that the present invention does not exclude the use of another resin having properties equivalent to polyimide, such as polyetherimide, aramid, or the like.

Figure 1B:

Then, an electrically conductive adhesive is prepared by mixing and dispersing, in a matrix adhesive, fine particles of an electrically conductive filler such as of silver (Ag) or gold (Au) having a particle size of not greater than 1 $\mu$m, preferably ranging from 0.3 $\mu$m and 0.5 $\mu$m. The electrically conductive adhesive thus prepared is applied to the surface of the resin substrate 1, by a suitable technique such as spin coating, roll coating, screen printing and bar coating, so as to form a layer having a thickness of from 3 $\mu$m to 5 $\mu$m. The coating layer thus formed is then cured by heating, whereby an electrically conductive resin film 2 is formed as shown in FIG. 1B. A polyimide-type adhesive or an epoxy-type adhesive may be used as the matrix adhesive in which Ag is to be dispersed. In order to obtain good adhesion between the resin substrate 1 and the electrically conductive resin film 2, it is preferred to use an adhesive which is the same as the material of the resin substrate 1. In this embodiment, therefore, a polyimide-type adhesive is used as the matrix adhesive. The heating for the purpose of curing the adhesive is conducted by, for example, adopting a two-staged heating employing approximately 30-minute heating at 150° C. for evaporating the solvent, and a subsequent heating which is conducted for 30 minutes or so at a temperature ranging from 220° C. to 250° C.

The volumetric resistivity of the electrically conductive resin film 2 thus formed varies according to the filling ratio of the electrically conductive filler. For instance, when Ag is used as the electrically conductive filler at a ratio of from 65 wt % to 75 wt %, the volumetric resistivity is 0.0001 (/cm).

Although Ag and Au have been specifically mentioned as being suitable for use as the filler material, it is to be understood that other materials such as Ni, Cu, ITO and so forth may be used as well.

Figure 1C:
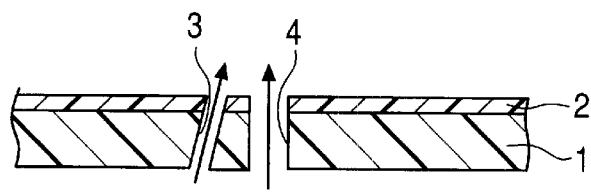

Then, as shown in FIG. 1C, perforating operation is conducted on the resin substrate 1 and the electrically conductive resin film 2 by means of KrF (Krypton fluoride) excimer laser having a wavelength of 248 nm, thereby forming an ink nozzle 3 through which the ink is to be discharged and a diluting liquid nozzle 4 for discharging a diluting liquid. More specifically, the ink nozzle 3 is formed to have a circular opening of an inside diameter of 12 $\mu$m or so, at an inclination angle of about 30°, whereas the diluting liquid nozzle 4 is formed to have a circular opening of an inside diameter of 35 $\mu$m or so with the axis extending orthogonally to the surface of the resin substrate 1.

Instead of the perforating by the excimer laser, one or more of known techniques such as drilling, pressing and etching can be used independently or in combination, for the purpose of forming the ink nozzle 3 and the diluting liquid nozzle 4. By using any of these techniques, the nozzles can be formed in the electrically conductive resin film 2 without problem, by virtue of the fact that the particle size of the fine filler particles is not greater than 1 $\mu$m.

Figure 1D:
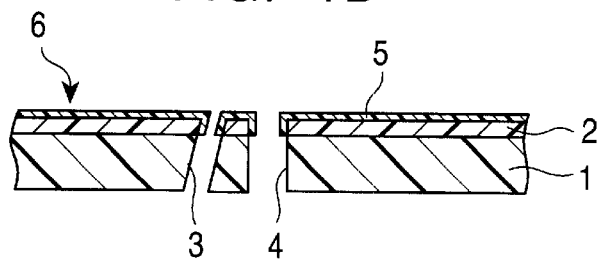

After the ink nozzle 3 and the diluting liquid nozzle 4 are formed in the manner described, a polyimide electro-deposited composite film 5 is formed on the electrically conductive resin film 2 overlying the resin substrate 1, while allowing co-deposition of water-repellant fine particles, whereby a nozzle plate 6 is obtained as shown in FIG. 1D. The polyimide composite electro-deposited film 5 is formed under predetermined conditions, by using a mixture prepared by dispersing, in a solution of an electro-disposition composition, water-repellant fine particles of a particle size not greater than 1 $\mu$m together with a dispersant. More specifically, one of the following methods (1) to (5) may be used (1) A poor solvent such as methylethylketone or acetone is added to and mixed with an organic polar solution dissolving a polyamic acid, followed by mixing and dispersion of water-repellant fine particles as the eutectic fine particles. Then, composite electro-deposition is conducted by using the resultant admixture in the form of a solution or a colloidal dispersion solution.

(2) Water is added to an organic polar solution dissolving polyamic acid, followed by addition and dispersion of water-repellant fine particles as the eutectic fine particles. Composite electro-deposition is then conducted by using the thus-prepared aqueous dispersion liquid.

(3) Composite electro-deposition is conducted by employing mixture dispersion of polyamic acid and water-repellant fine particles (eutectic fine particles), using an aromatic diamine of a specific configuration, such as 3,3'-diaminobenzophenone or 1,3-bis(3-aminophenoxine).

(4) An electro-deposition polyimide composition is prepared, containing a neutral salt of polyimide as the product of the reaction between aromatic tetracarboxylic acid dianhydride and aromatic diamine, the aforesaid polar solvent dissolving polyimide, water and a solvent which is poor to the polyimide, wherein an aromatic diaminocarboxylic acid is used as part of the aromatic diamine. Water-repellant fine particles are mixed and dispersed as the eutectic fine particles, whereby a solution or a colloidal dispersion liquid is obtained. Composite electro-deposition is then conducted by using this solution or the colloidal dispersion liquid.

Preferably, the polyimide is a block polyimide. In addition, it is possible to use one of known etching techniques alone or two or more types of etching techniques in combination. Preferably, the aromatic diaminocarboxylic acid is 3,5 diaminobenzoic acid. It is also preferred that the aromatic diamine comprises 3,5-diaminobenzoic acid and 2,6-diaminopyridine.

(5) An electro-deposition paint composition is prepared from neutral salt of polyamic acid which is a product of reaction between aromatic tetracarboxylic acid dianhydride and aromatic diamine, a polar solvent that can dissolve the polyamic acid, water, and an alcohol having a phenyl group, a furfuryl group or a naphthyl group. Then, water-repellant fine particles as eutectic fine particles are mixed and dispersed in this electro-deposition paint composition, and composite electro-deposition is conducted by using the resultant solution or colloidal dispersion liquid.

In this case, it is also preferred that aromatic bismaleimide and aromatic diamine are added to the above-mentioned solution or colloidal dispersion solution, prior to the composite electro-deposition.

One, two or more of the following resins may be used as the material of the water-repellant fine particles: PTFE (polytetrafluoroethylene resin); FEP (polytetrafluoroethylene-hexafluoropropylene copolymer resin); PFA (polytetrafluoroethylene-fluoroalkylvinylether copolymer resin); ETFE (polytetrafluoroethylene-ethylene copolymer resin); ECTFE (trifluoromonochloroethylene-ethylene copolymer resin); PCTFE (trifluoromonochloroethylene resin); PVDF(vinylidene fluoride resin); VDF (vinyl fluoride resin); fluorocarbon $((CF)_n)$; graphite fluoride; and TFEO (tetrafluoroethylene oligomer). Preferably, the particle size of the water-repellant fine particles is 1.0 $\mu$m or smaller.

In each of the methods (1) to (5) described above, the water-repellant fine particles (eutectic fine particles) may be treated with a surfactant or a silane coupling agent, as required. Such a treatment improves dispersion of the eutectic fine particles in the electro-deposition solution and enhances the affinity or adhesion between the eutectic fine particles and the electro-deposited film, thus achieving greater water-repelling effect.

Among the methods (1) to (5) for forming a polyimide composite electro-deposited film 5, the method (4) and (5) are particularly preferred.

The polyimide composite electro-deposited film formed by the described process is subjected as required to rinsing with water and subsequent dehydration, followed by a baking treatment. The baking treatment may be conducted in two stages: 30 to 60 minutes at 140° C. to 180° C., and 30 to 60 minutes at 220° C. to 260° C. The baking treatment is conducted by, for example, using a metallic plate having a flat and smooth surface that has been subjected to a mold releasing surface treatment. The metallic plate is pressed against the electro-deposited surface, so as to eliminate any irregular projection of water-repellant fine particles exposed on the surface of the electro-deposited layer, thereby flattening and smoothing the surface of the product polyimide composite electro-deposited film 5.

The metallic plate employed in the baking treatment may be a stainless steel sheet of, for example, 10 mm thick or so, having a surface which is mirror-finished through polishing, flattening and smoothing, followed by mold releasing treatment. It is also possible to use a metallic plate having an electro-plated or electroless-plated nickel composite plating layer which is formed by using a nickel electro-plating bath or electroless plating bath containing fine particles of boron nitride (BN) or molybdenum disulfide ($MoS_2$) mixed and dispersed therein. The fine particles of boron nitride or molybdenum disulfide serves as eutectic fine particles having mold-releasing effect, and are co-deposited on the surface of the metallic plate when the electro-plating or electroless plating is conducted under a predetermined condition. This type of metallic plate also is required to have a flat and smooth surface which is mirror-finished through polishing.

In accordance with the described process for producing the nozzle plate 6, the polyimide composite electro-deposited film 5 is formed on the electrically conductive resin film 2 overlying the resin substrate 1, such that the water-repellant fine particles are co-deposited in the polyimide composite electro-deposited film 5. As a consequence, the resultant nozzle plate 6 exhibits superior water-repelling performance.

The flattening and smoothing the surface of the polyimide composite electro-deposited film 5, effected by pressing by the metallic plate, provides a greater area of exposure of the water-repellant fine particles, thus enhancing the water-repelling effect while offering greater resistance to separation of the water-repellant fine particles from the polyimide composite electro-deposited film 5 which may be caused by, for example, rubbing or scratching. It is thus possible to suppress deterioration of water-repelling performance of the polyimide composite electro-deposited film 5.

Figure 1E:
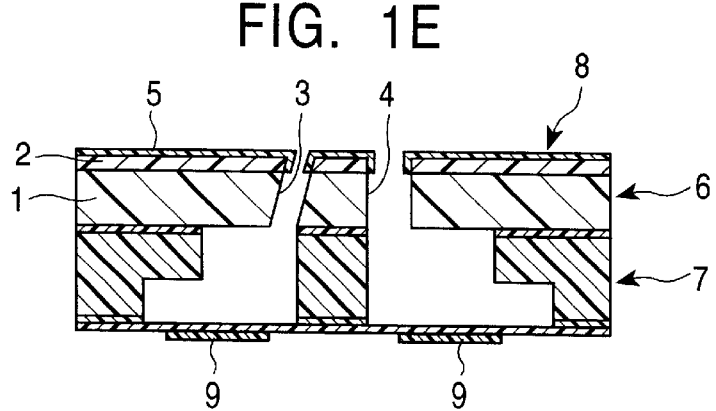

An ink jet recording head 8 is produced by using the nozzle plate 6 which is fabricated by the described process. More specifically, as shown in FIG. 1E, an ink jet main part 7 is attached to the reverse side of the resin substrate 1 having the ink nozzle 3, diluting liquid nozzle 4 and the polyimide composite electro-deposited film 5, whereby the ink jet recording head 8 is obtained. The bonding of the ink jet tank main part 7 to the resin substrate 1 is achieved by placing a thermoplastic polyimide therebetween and applying heat and pressure, or by means of a polyimide-type adhesive. A piezoelectric element 9 is fixed to the surface of the ink jet tank main part 7 opposite to the resin substrate 1, by means of a thermoplastic polyimide or a polyimide-type adhesive. A thermoplastic polyimide which becomes plastic at a low temperature, or a polyimide-type adhesive that cures at a low temperature, is preferably used for bonding the piezoelectric element 9.

In the foregoing description, the ink nozzle 3 and the diluting liquid nozzle 4 are formed by perforating both the resin substrate and the electrically conductive resin film 2. This, however, is not exclusive and the ink nozzle 3 and the diluting liquid nozzle 4 may be formed in accordance with the following procedure.

Figure 2A:
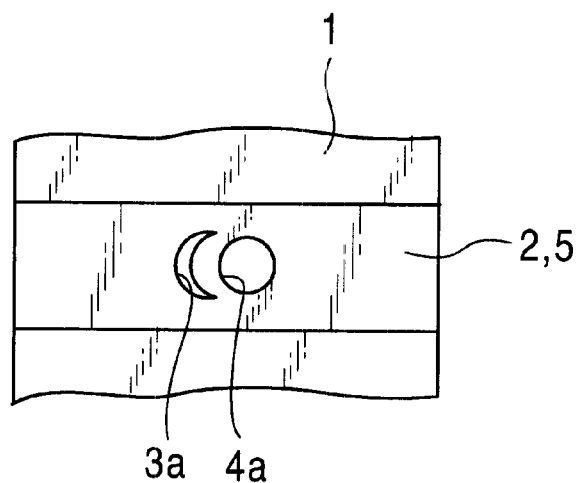
FIGS. 2A and 2B are illustrations of critical portions of an electrically conductive resin film formed by patterning.
Figure 2B:
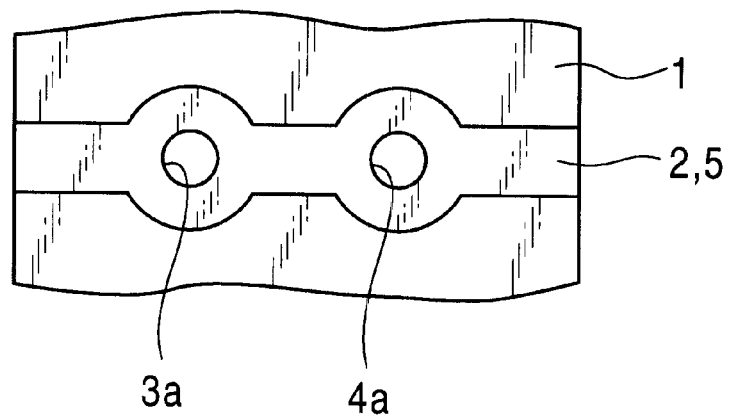

A patterned electrically conductive resin film 2 is prepared as shown in FIG. 2A or 2B, and a polyimide composite electro-deposited film 5 is formed on the patterned electrically conductive resin film 2. Then, openings 3a and 4a for discharge nozzles are formed in the polyimide composite electro-deposited film 5, and bores intended to serve as the ink nozzle 3 and the diluting liquid nozzle 4 are formed in the resin substrate 1 so as to lead to the nozzle openings 3a and 4a. The patterning of the electrically conductive resin film 2 may be effected by applying an electrically conductive adhesive in a predetermined pattern by means of screen printing method or roll coating method. Alternatively, the electrically conductive adhesive is photo-sensitized so as to be patterned by a photolithographic technique.

In the embodiment described hereinbefore, the polyimide composite electro-deposited film 5 is formed directly on the electrically conductive resin film 2. The polyimide composite electro-deposited film 5 is formed such that the polyimide is electro-deposited on the nuclei presented by the surfaces of the electrically conductive fillers that are rigidly held by the resin of the electrically conductive resin film 2. At the same time, the water-repellant fine particles are co-deposited and caught by the skin portion of the deposited film. In view of this mechanism of electro-disposition, it is advisable, although not essential, that the surface of the electrically conductive resin film 2 is lightly polished with a buff or the resin is lightly etched so as to expose the electrically conductive fillers, thereby enhancing the speed of growth of the electro-deposited film, as well as the speed of adhesion.

In the embodiment described hereinbefore, the electrically conductive resin film 2 is formed by applying to the surface of the resin substrate 1 an electrically conductive adhesive containing an electrically conductive filler dispersed therein, and curing thus applied electrically conductive adhesive. This, however, is only illustrative and the electrically conductive film may be formed by bonding a resin film containing electrically conductive fillers dispersed therein to the surface of a flat resin substrate 1 by applying heat and pressure.

FIGS. 3A to 3D are illustrations of another embodiment of the process of the invention for forming a polyimide composite electro-deposited film, used in the production of a nozzle plate.

A resin substrate 1 made of a polyimide sheet as shown in FIG. 1A is prepared. A copper foil of 10 μm to 15 μm thick is bonded to the resin substrate 1 through a thermal crosslinking reaction. The copper foil is then etched chemically or polished, whereby an electrically conductive film 10 having a thickness of 3 μm to 5 μm is obtained.

Subsequently, the electrically conductive film 10 is patterned by a known technique such as photolithography or etching, whereby an ink nozzle opening 11a of a predetermined size, e.g., 18 μm long and 12 μm wide, and a diluting liquid nozzle opening 12a of a predetermined size, e.g., 35 μm in inside diameter, are formed so as to extend perpendicularly to the resin substrate 1. Preferably, the etching is conducted by using ferric chloride as the etchant.

Figure 3A:
FIGS. 3A to 3D are illustrations of successive steps of another embodiment of the process of the invention for forming a polyimide electro-deposited composite film applied to the production of a nozzle plate, showing the nozzle plate at different steps of the production in sectional side views.
Figure 3B:
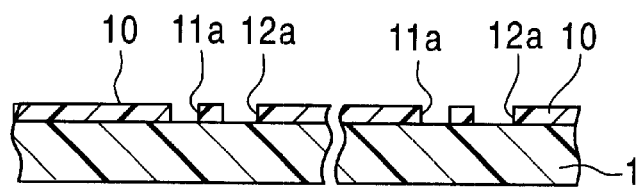
Figure 3C:
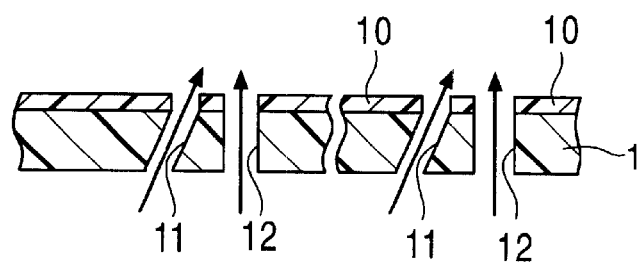

The ink nozzle opening 11a and the diluting liquid nozzle opening 12a may be formed by a technique other than the etching, e.g., by drilling. In such a case, the openings, in particular the ink nozzle opening 11a, is formed at an inclination angle of 30° or so, as shown at the left-hand part of FIG. 3B. Then, the resin substrate 1 is perforated by means of a KrF((Krypton fluoride) excimer laser having a wavelength of 248 nm, thereby forming bores which lead to the ink nozzle opening 11a and the diluting liquid nozzle opening 12a, respectively, as shown in FIG. 3C, whereby an ink nozzle 11 and a diluting liquid nozzle 12 are obtained. As in the first embodiment described before in connection with FIGS. 1A to 1E, the ink nozzle 11 is formed at an inclination angle of about 30°.

Figure 3D:
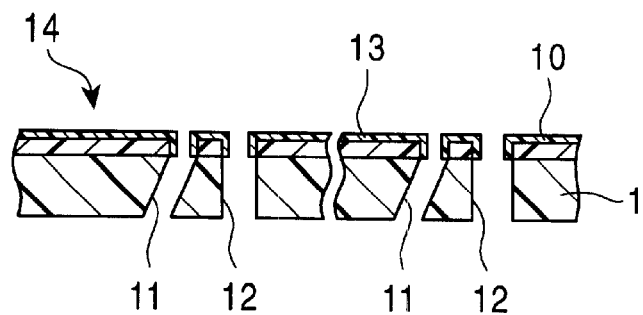

As in the case of the first embodiment described before with reference to FIGS. 1A to 1E, after the formation of the ink nozzle 11 and the diluting liquid nozzle 12, a polyimide composite electro-deposited film 13 is formed on the electrically conductive film 10 covering the resin substrate 1, while allowing co-deposition of the water-repellant fine particles, whereby a nozzle plate 14 is obtained as shown in FIG. 3D. A baking treatment by pressing a metallic plate as conducted in the preceding embodiment may also be conducted as required after the formation of the polyimide composite electro-deposited film 13.

The nozzle plate 14 produced by the described method also exhibits superior water-repelling performance, since the polyimide composite electro-deposited film 13 is formed with the co-deposition of the water-repellant fine particles.

Further, the baking treatment effected by pressing the metallic plate, when executed, flattens and smoothes the surface of surface of the polyimide composite electro-deposited film. This serves to increase the exposure area of the water-repellant fine particles, thereby enhancing the water-repelling performance, while providing greater resistance to separation of the water-repellant fine particles from the polyimide composite electro-deposited film 13 which may occur due to, for example, rubbing. consequently, degradation of the water-repelling performance of the polyimide composite electro-deposited film 13 can effectively be suppressed.

Figure 4A:
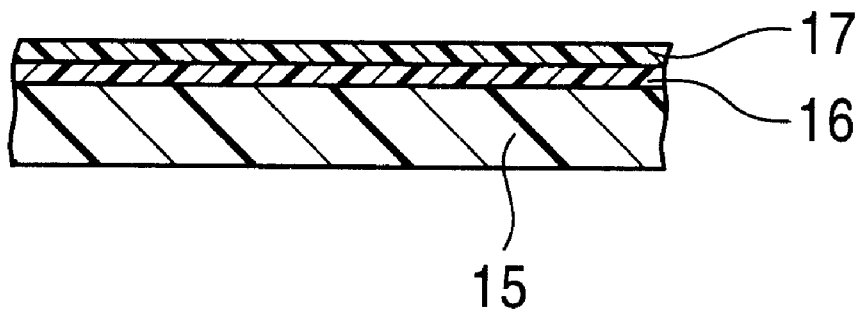
FIGS. 4A and 4B are sectional side views showing critical portions of a laminate structure, illustrating the process of the present invention for forming a polyimide composite electro-deposited film.
Figure 4B:
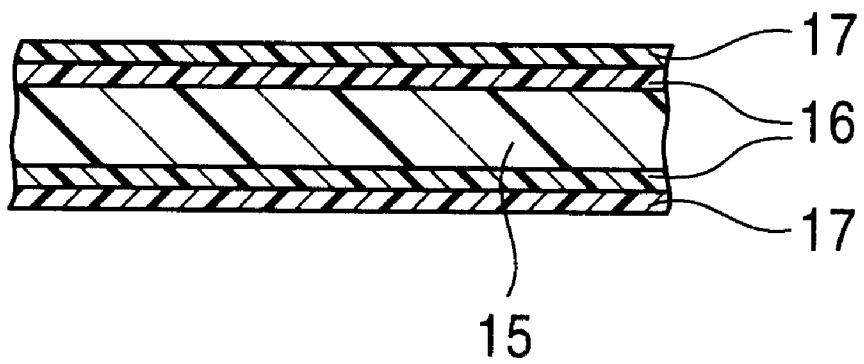

FIGS. 4A and 4B are illustrations of examples of the process of the invention for forming a polyimide composite electro-deposited film. In these Figures, the resin substrate made of, for example, polyimide is denoted by numeral 15.

In the example shown in FIG. 4A, an electrically conductive resin film 18 is formed on one side of the resin substrate 15, in the same manner as that in the embodiment described before with reference to FIGS. 1A to 1D. Subsequently, a polyimide composite electro-deposited film 17 is formed on the electrically conductive resin film 16.

Referring now to the example shown in FIG. 4B, electrically conductive resin films 16 are formed on both sides of the resin substrate 15 by the same technique as that employed in the embodiment described before in connection with FIGS. 1A to 1D. Thereafter, polyimide composite electro-deposited films 17 are formed on the respective electrically conductive resin films 16.

In the embodiment shown in FIGS. 4A and 4B, one or more selected from a group consisting of water-repellant fine particles, wear-resistant fine particles and mold-releasing fine particles are selected as the eutectic fine particles, depending on the natures or functions to be developed by the polyimide composite electro-deposited film 17, e.g., water-repelling function, wear resistance and/or mold-releasing function. The electro-deposition solution is prepared by using such eutectic fine-particles.

One, two or more of the aforesaid water-repellant fine particles may be used also in this case. One, two or more of the following materials may be used as the material of the wear-resistant fine particles: silicon carbide (SiC), diamond, tungsten carbide (WC), aluminum oxide ($Al_2O_3$), zirconium oxide ($ZrO_2$), cubic boron nitride (CBN), titanium oxide ($TiO_2$), chromium oxide ($Cr_2O_3$), titanium carbide (TiC), boron carbide ($B_4C$), titanium nitride (TiN), cerium oxide ($CeO_3$), titanium boride ($TiB_2$), and thorium oxide ($ThO_2$). One or more selected from the group consisting of boron nitride (BN) and molybdenum disulfide ($MOS_2$) are suitably used as the mold-releasing fine particles. Preferably, the wear-resistant fine particles and mold-releasing fine particles have particle sizes not greater than 1.0 μm.

These eutectic fine particles may be treated with a surfactant or a silane coupling agent, as required. Such a treatment improves dispersion of the eutectic fine particles in the electro-deposition solution and enhances the affinity or adhesion between the eutectic fine particles and the electro-deposited film, thus achieving greater water-repellant effect, wear resistance and/or mold-releasing performance.

After the formation of the electro-deposited film with co-deposition of the eutectic fine particles, a baking treatment by pressing the metallic plate is conducted as required in the same way as that done in the embodiment described before in connection with FIGS. 1A to 1D.

In the described process for forming the polyimide composite electro-deposited film 17, the electro-deposited film 17 is formed on the electrically conductive resin film 16 covering the resin substrate 15, while allowing co-disposition of wear-resistant fine particles or mold-releasing fine particles, whereby wear-resistance or mold-releasing function is imparted to the resin substrate 15 by the effect of the polyimide composite electro-deposited film 17.

FIGS. 5A to 5D are illustrations of different examples of the process of the invention for forming a polyimide composite electro-deposited film. In these Figures, the resin substrate made of, for example, polyimide is denoted by numeral 18.

Figure 5A:
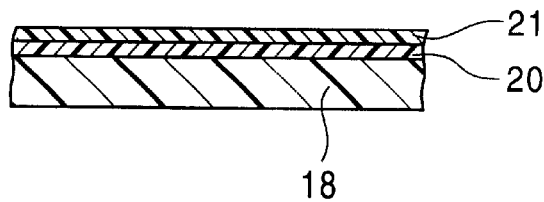
FIGS. 5A to 5D are sectional side views showing critical portions of laminate structures, illustrating the process of the present invention for forming a polyimide electro-deposited composite film.

In the example shown in FIG. 5A, an electrically conductive film 20 made of a metallic foil is formed on one side of the resin substrate 18, in the same manner as that in the embodiment described before with reference to FIGS. 3A to 3D. Subsequently, a polyimide composite electro-deposited film 21 is formed on the electrically conductive resin film 20.

Figure 5B:
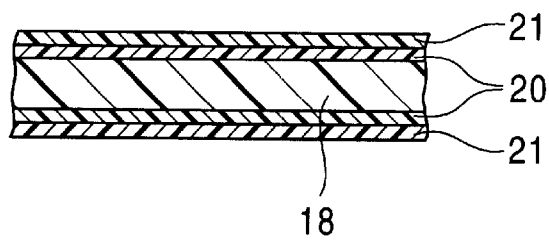

Referring now to the example shown in FIG. 5B, electrically conductive films 20 are formed on both sides of the resin substrate 18 in the same manner as that in the embodiment described before with reference to FIGS. 3A to 3D. Thereafter, polyimide composite electro-deposited films 21 are formed on the respective electrically conductive films 20.

Figure 5C:
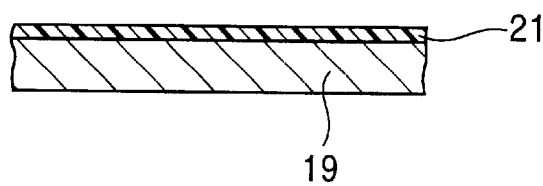

In the example shown in FIG. 5C, the polyimide composite electro-deposited film 21 is formed directly on one side of a metallic substrate 19.

Figure 5D:
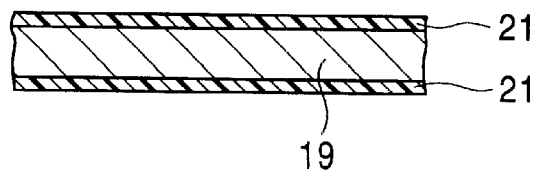

Similarly, in the example shown in FIG. 5D, the polyimide composite electro-deposited film 21 is formed directly on each of the two sides of the metallic substrate 19.

After the electro-deposited film is formed while allowing co-deposition of eutectic fine particles, a baking treatment is effected as required by pressing metallic plate, as in the embodiment described before with reference to FIGS. 4A and 4B.

In the described process of the invention for forming the polyimide composite electro-deposited film 21, the electro-deposited film 21 is formed on the electrically conductive film 20 covering the resin substrate 18 or on the metallic substrate 19, while allowing co-deposition of the wear-resistant fine particles or mold-releasing fine particles. It is therefore possible to impart wear resistance or mold-releasing function to the resin substrate 18 or the metallic substrate 19, by the effect of the polyimide composite electro-deposited film 21.

As will be understood from the foregoing description, the present invention offers the following advantages.

In accordance with the first aspect of the invention, the polyimide composite electro-deposited film is formed on the conductive film covering the resin substrate, while allowing co-deposition of one or more eutectic fine particles selected from among water-repellant fine particles, wear-resistant fine particles and mold-releasing fine particles. It is therefore possible to impart to the resin substrate one or more of the desired characteristics selected from among water-repelling performance, wear resistance or mold-releasing performance.

In accordance with another aspect of the present invention, the polyimide composite electro-deposited film is formed on the metallic substrate, while allowing co-disposition of one or more eutectic fine particles selected from among water-repellant fine particles, wear-resistant fine particles and mold-releasing fine particles. It is therefore possible to impart to the metallic substrate one or more of the desired characteristics selected from among water-repelling performance, wear resistance or mold-releasing performance.

Each of these two aspects of the process of the invention, when water-repellant fine particles are used as the eutectic fine particles, can suitably be employed in the production of a nozzle plate of an ink jet recording head, offering the following advantages.

The polyimide composite electro-deposited film is formed directly on a substrate surface or through the intermediary of a conductive film, while allowing co-disposition of the water-repellant fine particles. This enables production of an ink jet recording head having a nozzle plate which is free of wetting with oily or aqueous ink and which can ensure high degree of linearity, i.e., straight-going nature, of the jetted ink droplets, as well as discharge stability, thus providing a high quality of the printed image.

When the process of the invention is used in the production of a nozzle plate having a metallic substrate, it is possible to freely set a water-repelling region and non-repelling region in the nozzle bore. In other words, it is possible to suitably select the thickness of the conductive film formed on the nozzle surface. This makes it possible to maintain the ink meniscus so as to ensure high degree of linearity, i.e., straight-going nature, of the jetted ink droplets, as well as discharge stability, thereby providing a nozzle plate of an ink jet recording head that ensures high quality of the printed image.

The free selection of the thickness of the polyimide composite electro-deposited film serves to suppress degradation of the water-repelling performance caused by wiping of the nozzle surface during long use of the product nozzle plate.

It is also to be understood that the material of the water-repellant fine particles can be selected in accordance with the performance and the type of the ink to be used, thus enabling production of a nozzle plate which excels in the linearity of the jetted ink droplets and which suffers from reduced unevenness of the discharge, thus offering a high quality of the printed image.

The process of the invention may be carried out such that a discharge nozzle is formed in an electrically conductive film prepared from a polyimide type conductive adhesive or an epoxy-resin-type conductive adhesive that exhibits high strength of bonding to the substrate made from polyimide or polyetherimide which excels in heat resistance, chemical resistance, i.e., resistance to ink, durability and workability with excimer laser. The polyimide composite electro-deposited film is then formed, while allowing co-disposition of the water-repellant fine particles. This overcomes difficulty in regard to the machining of the ink discharge nozzle and assembly of the ink nozzle head main part, while offering high degrees of quality and reliability over a long period of use.

The process of the present invention can be used in the production of a nozzle plate of the type which employs an electrically conductive resin film as the conductive film. In such a case, the electrically conductive film can be applied in a predetermined pattern by screen printing method. Alternatively, the resin is photo-sensitized and processed by photolithographic technique so as to form a desired pattern around the ink jet nozzle. The polyimide electro-deposited film is formed on the electrically conductive film, together with co-deposited water-repellant fine particles. This process effectively prevents deformation of the ink jet recording head attributable to a difference in the thermal expansion coefficient between the resin substrate and the laminate structure composed of the electrically conductive resin plate and the composite electro-deposited film. Use of the same material, e.g., polyimide, as the main materials of both the resin substrate and the conductive adhesive serves to further suppress thermal distortion of the ink jet recording head.

The process of the present invention may be used in the production of a nozzle plate having a resin substrate and an electrically conductive film formed of a conductive resin film. In this case, the polyimide composite electro-deposited film is formed by electro-plating technique, while allowing co-deposition of water-repellant fine particles, on the surface of the conductive resin film which has a certain degree of roughness. Then, the surface of the polyimide composite electro-deposited film is pressed, at a suitable temperature not lower than the softening point of the water-repellant fine particles, by a metallic plate having a flat and smooth surface that has been subjected to a mold-releasing treatment. Alternatively, the surface of the polyimide is polished. As a result of the pressing or polishing, projections of the water-repellant fine particles are reduced so that the area of exposure of the water-repellant fine particles is increased, whereby a greater water-repelling effect is obtained and degradation of the water-repelling effect due to wiping is suppressed over a long period of use. It is therefore possible to obtain an ink jet recording head that can ensure high quality of the printed image, through elimination of inferior discharge of the ink droplets and inferior linearity, i.e., straight-going characteristic, of the jetted ink droplets.

It is also to be appreciated that the composite electro-deposited film exhibits superior affinity to the surface of the electrically conductive resin film which has a certain degree of surface roughness, thus offering a further improvement in the resistance to wiping.

What is claimed is:

1. A process for forming a polyimide composite electro-deposited film, comprising the steps of:
    forming an electrically conductive film on at least one side of a resin substrate of a ink nozzle; and
    forming, on said electrically conductive film, the polyimide composite electro-deposited film while allowing co-deposition of at least one of a eutectic fine particle, the fine particle further selected from the group consisting of water-repellant fine particles, wear-resistant fine particles and mold-releasing fine particles.

2. A process according to claim 1, further comprising the step of:
    pressing the surface of the formed polyimide composite electro-deposited film by a metallic plate having a flat smooth surface that has undergone a mold-releasing treatment, or polishing the surface of the formed polyimide composite electro-deposited film, so as to reduce projections of the fine particles from the surface of said polyimide composite electro-deposited film and to increase the exposure area of the fine particles.

3. A process according to claim 1, wherein said electrically conductive film is an electrically conductive resin film having electrically conductive fillers mixed and dispersed therein.

4. A process according to claim 1, wherein said electrically conductive film comprises a metal foil.

5. A process according to claim 1, wherein the polyimide composite electro-deposited film is formed through a composite electro-deposition conducted by using a solution or a colloidal dispersion solution which is formed by preparing an organic polar solution dissolving polyamic acid, mixing and dispersing a poor solvent comprising methylethylketone or acetone with and in said polar solution, and mixing and dispersing said eutectic fine particles with and in the resultant mixture.

6. A process according to claim 1, wherein the polyimide composite electro-deposited film is formed through a composite electro-deposition conducted by using an aqueous dispersion liquid which is formed by preparing an organic polar solution dissolving polyamic acid, adding water to the polar solution, and mixing and dispersing said eutectic fine particles in the water-added solution.

7. A process according to claim 1, wherein the polyimide composite electro-deposited film is formed through a composite electro-deposition conducted by using an aqueous electro-deposition solution which is formed by mixing and dispersion of-polyamic acid and eutectic fine particles, using 3,37-diaminobenzophenone or 1,3-bis(3-aminophenoxine) benzene.

8. A process according to claim 1, wherein the polyimide composite electro-deposited film is formed through a composite electro-deposition conducted by using a solution or a colloidal dispersion liquid which is formed by preparing an electro-deposition polyimide composition comprising neutral salt of a polyamic acid as the product of a reaction between an aromatic tetracarboxylic acid dianhydride and an aromatic diamine, using a polar solvent to dissolve the polyamic acid, water, and a solvent which is poor to polyimide, with part of said aromatic diamine constituted by an aromatic diaminocarboxylic acid, and mixing and dispersing said eutectic fine particles in said electro-deposition polyimide composition.

9. A process according to claim 1, wherein the polyimide composite electro-deposited film is formed through a composite electro-deposition conducted by using a solution or a colloidal dispersion liquid which is formed by preparing an electro-deposition paint composition comprising neutral salt of a polyamic acid as the product of a reaction between an aromatic tetracarboxylic acid dianhydride and an aromatic diamine, using a polar solvent to dissolve the polyamic acid, water, and an alcohol having a phenyl group, a furfuryl group or a naphthyl group, and mixing and dispersing said eutectic fine particles in said electro-deposition paint composition.

10. A process according to claim 1, wherein water-repellant fine particles are used as said eutectic fine particles, whereby a nozzle plate having a discharge nozzle is obtained.

11. A process for forming a polyimide composite electro-deposited film, comprising the steps of:
    forming, on at least one side of a metallic substrate of a ink nozzle, the polyimide composite electro-deposited film while allowing co-deposition of at least one one of a eutectic fine particle selected from the group consisting of water-repellant fine particles, wear-resistant fine particles and mold-releasing fine particles.

12. A process according to claim 11, further comprising the step of:
    pressing the surface of the formed polyimide composite electro-deposited film by a metallic plate having a flat smooth surface that has undergone a mold-releasing treatment, or polishing the surface of the formed polyimide composite electro-deposited film, so as to reduce projections of the fine particles from the surface of said polyimide composite electro-deposited film and to increase the exposure area of the fine particles.

13. A process according to claim 11, wherein the polyimide composite electro-deposited film is formed through a composite electro-deposition conducted by using a solution or a colloidal dispersion solution which is formed by preparing an organic polar solution dissolving polyamic acid, mixing and dispersing a poor solvent comprising methylethylketone or acetone with and in said polar solution, and mixing and dispersing said eutectic fine particles with and in the resultant mixture.

14. A process according to claim 1, wherein the polyimide composite electro-deposited film is formed through a composite electro-deposition conducted by using an aqueous dispersion liquid which is formed by preparing an organic polar solution dissolving polyamic acid, adding water to the polar solution, and mixing and dispersing said eutectic fine particles in the water-added solution.

15. A process according to claim 11, wherein the polyimide composite electro-deposited film is formed through a composite electro-deposition conducted by using an aqueous electro-deposition solution which is formed by mixing and dispersion of polyamic acid and eutectic fine particles, using 3,37-diaminobenzophenone or 1,3-bis(3-aminophenoxine)benzene.

16. A process according to claim 11, wherein the polyimide composite electro-deposited film is formed through a composite electro-deposition conducted by using a solution or a colloidal dispersion liquid which is formed by preparing an electro-deposition polyimide composition comprising neutral salt of a polyamic acid as the product of a reaction between an aromatic tetracarboxylic acid dianhydride and an aromatic diamine, using a polar solvent to dissolve the polyamic acid, water, and a solvent which is poor to polyimide, with part of said aromatic diamine constituted by an aromatic diaminocarboxylic acid, and mixing and dispersing said eutectic fine particles in said electro-deposition polyimide composition.

17. A process according to claim 11, wherein the polyimide composite electro-deposited film is formed through a composite electro-deposition conducted by using a solution or a colloidal dispersion liquid which is formed by preparing an electro-deposition paint composition comprising neutral salt of a polyamic acid as the product of a reaction between an aromatic tetracarboxylic acid dianhydride and an aromatic diamine, using a polar solvent to dissolve the polyamic acid, water, and an alcohol having a phenyl group, a furfuryl group or a naphthyl group, and mixing and dispersing said eutectic fine particles in said electro-deposition paint composition.

18. A process according to claim 11, wherein water-repellant fine particles are used as said eutectic fine particles, whereby a nozzle plate having a discharge nozzle is obtained.

* * * * *